(12) United States Patent
Lin et al.

(10) Patent No.: US 11,570,786 B2
(45) Date of Patent: Jan. 31, 2023

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/223,640

(22) Filed: Apr. 6, 2021

(65) Prior Publication Data

US 2021/0227555 A1 Jul. 22, 2021

Related U.S. Application Data

(63) Continuation of application No. PCT/CN2019/098039, filed on Jul. 26, 2019.

(51) Int. Cl.
*H04W 72/10* (2009.01)

(52) U.S. Cl.
CPC .................. *H04W 72/10* (2013.01)

(58) Field of Classification Search
CPC ............. H04W 72/10; H04W 72/1284; H04W 72/085; H04W 72/0493; H04W 72/06;
(Continued)

(56) References Cited

U.S. PATENT DOCUMENTS

| 2017/0223695 A1 | 8/2017 | Kwak et al. |
| 2019/0045546 A1* | 2/2019 | Li ................ H04L 5/0073 |

(Continued)

FOREIGN PATENT DOCUMENTS

| CN | 108123777 A | 6/2018 |
| CN | 108513735 A | 9/2018 |

(Continued)

OTHER PUBLICATIONS

3GPP TSG-RAN WG1 #96—R1-1903369—Athens, Greece, Feb. 25-Mar. 1, 2019—Nokia, Nokia Shanghai Bell, Summary of contributions on UL/DL intra-UE prioritization/multiplexing (26 pages).

(Continued)

*Primary Examiner* — John D Blanton
(74) *Attorney, Agent, or Firm* — Perkins Coie LLP

(57) ABSTRACT

Provided are a wireless communication method and a device. The wireless communication method includes: determining a target uplink channel based on an overlapping situation of at least two types of uplink channels to be transmitted, if at least two types of uplink channels to be transmitted are overlapped, wherein the at least two uplink channels to be transmitted are respectively used for transmitting part or all of information carried by the at least two types of uplink channels; and transmitting the target uplink channel, wherein the target uplink channel is used for transmitting part or all of information carried by the at least two uplink channels to be transmitted. The at least two uplink channels to be transmitted are multiplexing channels of the at least two types of uplink channels respectively.

19 Claims, 4 Drawing Sheets

(58) Field of Classification Search
CPC . H04W 72/0413; H04L 5/0044; H04L 5/0053
See application file for complete search history.

(56) References Cited

U.S. PATENT DOCUMENTS

| | | | | |
|---|---|---|---|---|
| 2019/0261391 | A1* | 8/2019 | Kundu | H04W 72/0446 |
| 2020/0314900 | A1* | 10/2020 | Hosseini | H04W 72/10 |
| 2020/0344780 | A1* | 10/2020 | Choi | H04L 5/0044 |

FOREIGN PATENT DOCUMENTS

| | | |
|---|---|---|
| CN | 109314988 A | 2/2019 |
| CN | 109391388 A | 2/2019 |
| CN | 109392126 A | 2/2019 |
| CN | 109392168 A | 2/2019 |
| CN | 109412766 A | 3/2019 |
| CN | 109429349 A | 3/2019 |
| CN | 109618362 A | 4/2019 |
| CN | 109644034 A | 4/2019 |
| CN | 109644426 A | 4/2019 |
| CN | 109906576 A | 6/2019 |
| CN | 110024467 A | 7/2019 |
| EP | 3793303 A1 | 3/2021 |
| GB | 2572586 A | 10/2019 |
| RU | 2611436 C2 | 2/2017 |
| WO | 2017213436 A1 | 12/2017 |
| WO | 2018030396 A1 | 2/2018 |
| WO | 2019130522 A1 | 7/2019 |
| WO | 2019139446 A1 | 7/2019 |
| WO | 2019216740 A1 | 11/2019 |

OTHER PUBLICATIONS

3GPP TSG-RAN WG2 Meeting#104—R2-1816987—Spokane, USA, Nov. 12-16, 2018—Institute for Information Industry (III), Intra-UE prioritization and multiplexing between URLLC and eMBB (3 pages).

International Search Report dated Apr. 24, 2020 of PCT/CN2019/098039 (4 pages).

Decision on Grant of Patent for Russian Application No. 2021112277 issued Nov. 24, 2021. 23 pages with English translation.

Examination Report No. 1 for Australian Application No. 2019459712 dated Nov. 16, 2021. 4 pages.

Extended European Search Report for European Application No. 19939469.3 dated Nov. 9, 2021. 10 pages.

Ericsson "UCI Enhancements for NR URLLC" R1-1906092; 3GPP TSG RAN WG1 Meeting #97; Reno, NV, USA; May 13-17, 2019. 10 pages.

First Examiner's Report for Canadian Application No. 3,115,860 dated May 3, 2022. 5 pages.

First Office Action for Chinese Application No. 202110262688.0 dated Jul. 18, 2022. 12 pages with English translation.

Huawei et al. "UCI enhancements for URLLC" R1-1906058; 3GPP TSG RAN WG1 Meeting #97; Reno, USA, May 13-17, 2019. 10 pages.

Notice of Acceptance for Australian Application No. 2019459712 issued May 3, 2022. 3 pages.

Notice of Reasons for Refusal for Japanese Application No. 2021-538668 dated Jun. 3, 2022. 6 pages with English translation.

NTT Docomo, Inc. "UCI enhancements for URLLC" R1-1906212; 3GPP TSG RAN WG1 #97; Reno, USA, May 13-17, 2019. 11 pages.

Zte "UL control enhancements for NR URLLC" R1-1906410; 3GPP TSG RAN WG1 #97 Reno, USA; May 13-17, 2019. 9 pages.

Examination Report for Indian Application No. 202127018910 dated Oct. 31, 2022. 5 pages with English translation.

Notice of Allowance for Chinese Application No. 202110262688.0 dated Aug. 23, 2022. 5 pages with English translation.

Notice of Reasons for Refusal for Japanese Application No. 2021-538668 dated Oct. 14, 2022. 6 pages with English translation.

* cited by examiner

WIRELESS COMMUNICATION METHOD AND DEVICE

CROSS-REFERENCE TO RELATED APPLICATION

The present application is a continuation application of International PCT Application No. PCT/CN2019/098039, filed on Jul. 26, 2019, the entire content of which is hereby incorporated by reference.

TECHNICAL FIELD

Implementations of the present disclosure relate to a field of communications, and more particularly, to a wireless communication method and a device.

BACKGROUND

In New Radio (NR) Rel-15, it is specified that when resources of multiple uplink channels conflict and a multiplexing transmission condition is satisfied, a terminal device may determine a multiplexing transmission mode according to a type of Uplink control information (UCI) and a channel format of a Physical Uplink Control Channel (PUCCH). The multiplexing transmission mode refers to transmitting information carried by multiple uplink channels through one multiplexing uplink channel.

In addition, in NR Rel-16, Ultra-Reliable and Low Latency Communication (URLLC) is enhanced to reduce a delay.

However, if multiple overlapped uplink channels include an uplink channel for carrying URLLC UCI and an uplink channel for carrying Enhance Mobile Broadband (eMBB) UCI, and at this time, if the terminal device performs multiplexing transmission on multiple overlapped uplink channels based on an existing multiplexing transmission mode, a delay of URLLC UCI will be increased and a user experience is reduced.

In addition, when multiple overlapped uplink channels are multiplexed on an uplink channel for transmission, some data carried on the multiple overlapped uplink channels may be lost, which reduces a transmission performance and a success rate of data transmission.

In addition, when there are too many overlapped channels, a complexity of a multiplexing transmission mechanism will be increased.

SUMMARY

There is provided a wireless communication method and device, which may increase a user experience and a success rate of data transmission, and reduce a complexity of a multiplexing transmission mechanism.

In a first aspect, there is provided a wireless communication method, including:

determining a target uplink channel based on an overlapping situation of at least two uplink channels to be transmitted, if at least two types of uplink channels to be transmitted are overlapped, wherein the at least two uplink channels to be transmitted are respectively used for transmitting part or all of information carried by the at least two types of uplink channels; and transmitting the target uplink channel, wherein the target uplink channel is used for transmitting part or all of information carried by the at least two uplink channels to be transmitted, wherein the at least two uplink channels to be transmitted are multiplexing channels of the at least two types of uplink channels respectively.

In a second aspect, there is provided a wireless communication method, including:

determining a target uplink channel based on an overlapping situation of at least two uplink channels to be transmitted, if at least two types of uplink channels to be transmitted are overlapped, wherein the at least two uplink channels to be transmitted are respectively used for transmitting part or all of information carried by the at least two types of uplink channels; and receiving the target uplink channel, wherein the target uplink channel is used for transmitting part or all of information carried by the at least two uplink channels to be transmitted, wherein the at least two uplink channels to be transmitted are multiplexing channels of the at least two types of uplink channels respectively.

In a third aspect, there is provided a terminal device, configured to execute the method in the first aspect or various implementation modes thereof. Specifically, the terminal device includes function modules configured to execute the method in the first aspect or various possible implementation modes thereof.

In a fourth aspect, there is provided a network device, configured to execute the method in the second aspect or various implementation modes thereof. Specifically, the network device includes function modules configured to execute the method in the second aspect or various implementation modes thereof.

In a fifth aspect, there is provided a terminal device, including a processor and a memory. The memory is configured to store a computer program, and the processor is configured to call and run the computer program stored in the memory to execute the method in the first aspect or various implementation modes thereof.

In a sixth aspect, there is provided a network device, including a processor and a memory. The memory is configured to store a computer program, and the processor is configured to call and run the computer program stored in the memory to execute the method in the second aspect or various implementation modes thereof.

In a seventh aspect, there is provided a chip for implementing the method in any one of the above the first to second aspects or various implementation modes thereof. Specifically, the chip includes: a processor configured to call and run a computer program from a memory, to enable the device on which the chip is installed to execute the method in any one of the above first to second aspects or various implementation modes thereof.

In an eighth aspect, there is provided a computer-readable storage medium, configured to store a computer program, wherein the computer program enables a computer to execute the method in any one of the above first to second aspects or various implementation modes thereof.

In a ninth aspect, there is provided a computer program product including computer program instructions, wherein the computer program instructions enable a computer to execute a method in any one of the above first to second aspects or respective implementation modes thereof.

In a tenth aspect, there is provided a computer program which, when run on a computer, enables the computer to execute the method in any one of the above first to second aspects or various implementation modes thereof.

Based on above technical solution, at least two uplink channels to be transmitted for multiplexing transmission may be determined based on at least two types of uplink channels first, that is, a multiplexing transmission channel may be obtained for each type of uplink channels, then whether further multiplexing transmission is needed may be judged based on the at least two uplink channels to be transmitted to realize a transmission mechanism of a two-step multiplexing judgment. Therefore, not only may actual transmission requirements be guaranteed based on priorities of different types of uplink channels to improve a user experience, but also a probability of multiplexing the information carried by multiple uplink channels into one uplink channel for transmission may be reduced to improve a transmission performance and a success rate of data transmission. In addition, a judgment condition for multiplexing transmission may be simplified preferentially, and a complexity of a multiplexing transmission mechanism may be reduced.

DETAILED DESCRIPTION

The technical solution in implementations of the present disclosure will be described below with reference to the drawings in implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

Figure 1:
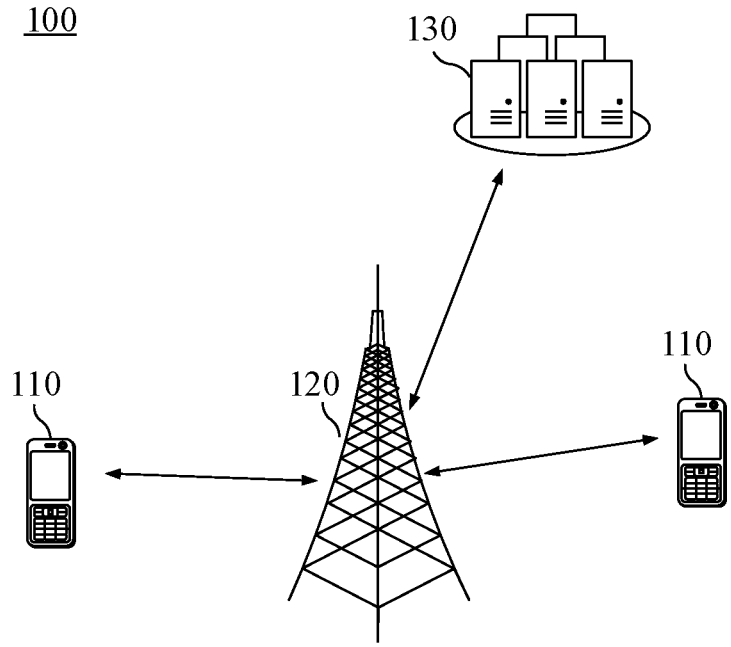
FIG. 1 is an example of an application scenario of the present disclosure.

FIG. 1 is a schematic diagram of an application scenario of an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the communication system 100 is only taken as an example for describing an implementation of the present disclosure. However, implementations of the present disclosure are not limited to this. In other words, the technical solutions in the implementations of the present disclosure may be applied in various communication systems, for example, a Long Term Evolution (LTE) system, an LTE Time Division Duplex (TDD) system, a Universal Mobile Telecommunication System (UMTS), a 5G communication system (also called a New Radio (NR) communication system), or a future communication system.

In the communication system 100 shown in FIG. 1, the network device 120 may be an access network device communicating with the terminal device 110. The access network device may provide communication coverage for a specific geographic area and may communicate with a terminal device (e.g., UE) 110 located within the coverage area.

Optionally, the network device 120 may be an Evolutional Node B (eNB or eNodeB) in an LTE system, or a Next Generation Radio Access Network (NG RAN) device, or a base station (gNB) in an NR system, or a radio controller in a Cloud Radio Access Network (CRAN). Or the network device may be a relay station, an access point, a vehicle-mounted device, a wearable device, a hub, a switch, a bridge, a router, or a network device in a future evolved Public Land Mobile Network (PLMN), etc.

Optionally, the terminal device 110 may be any terminal device, including but not limited to a terminal device connected with the network device 120 or other terminal devices by wire or wireless. Optionally, the terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Optionally, Device to Device (D2D) communication may be performed between the terminal devices 110.

The wireless communication system 100 further includes a core network device 130 that communicates with a base station. The core network device 130 may be a 5G Core (5GC) network device, for example, an Access and Mobility Management Function (AMF), an Authentication Server Function (AUSF), a User Plane Function (UPF), or a Session Management Function (SMF). Optionally, the core network device 130 may also be an Evolved Packet Core (EPC) device of the LTE network, for example, a Session Management Function+Core Packet Gateway (SMF+PGW-C) device. It should be understood that SMF+PGW-C may realize the functions which may be realized by the SMF and the PGW-C at the same time. In the process of network evolution, above-mentioned core network device may also be called by other names, or new network entities may be formed by dividing the functions of the core network, and this is not limited by implementations of the present disclosure.

In a specific example, various functional units in the communication system 100 may establish a connection through a next generation (NG) interface to realize communication.

Figure 2:
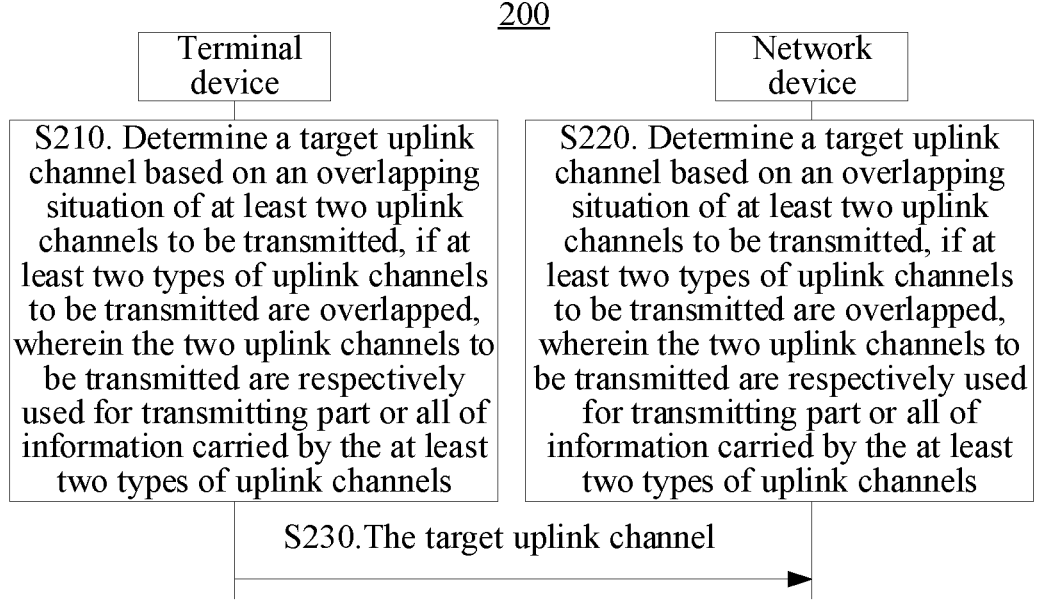
FIG. 2 is a schematic flowchart of a wireless communication method of an implementation of the present disclosure.

For example, the terminal device establishes an air interface connection with the access network device through the NR interface for transmitting user plane data and control plane signaling. The terminal device may establish a control plane signaling connection with AMF through NG interface 1 (N1 for short). The access network device, such as the next generation radio access base station (gNB), may establish a user plane data connection with UPF through NG interface 3 (N3 for short). The access network device may establish a control plane signaling connection with AMF through NG interface 2 (N2 for short). UPF may establish a control plane signaling connection with SMF through NG interface 4 (N4 for short). UPF may exchange user plane data with a data network through NG interface 6 (N6 for short). AMF may establish a control plane signaling connection with SMF through NG interface 11 (N11 for short). SMF may establish a control plane signaling connection with PCF through NG interface 7 (N7 for short). It should be noted that the part shown in FIG. 2 is only an exemplary architecture diagram. Besides functional units shown in FIG. 1, the network architecture may also include other functional units or functional entities. For example, the core network device may also include other functional units such as unified data management (UDM), which is not specifically limited by the implementations of the present disclosure.

FIG. 1 exemplifies a base station, a core network device and two terminal devices. Optionally, the wireless communication system 100 may include multiple base station devices and other quantity of terminal devices may be included in a coverage range of each base station, and this is not limited by the implementations of the present disclosure.

It should be understood that, a device with a communication function in a network/system in the implementations of the present disclosure may be referred to as a communication device. Taking the communication system 100 shown in FIG. 1 as an example, the communication device may include a network device 120 and a terminal device 110 which have communication functions, and the network device 120 and the terminal device 110 may be the specific devices described above, which will not be described here again. The communication device may also include other devices in the communication system 100, such as network controllers, mobile management entities, and other network entities, and this is not limited by the implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flow chart of a wireless communication method 200 according to an implementation of the present disclosure, and the method 200 may be performed by a terminal device or a network device. The terminal device shown in FIG. 2 may be the terminal device as shown in FIG. 1, and the network device shown in FIG. 2 may be the access network device as shown in FIG. 1.

As shown in FIG. 2, the method 200 includes acts S210 and S230.

In S210, if at least two types of uplink channels to be transmitted are overlapped, a terminal device determines a target uplink channel based on an overlapping situation of at least two uplink channels to be transmitted, wherein the two uplink channels to be transmitted are respectively used for transmitting part or all of information carried by the at least two types of uplink channels.

In S230, the terminal device transmits the target uplink channel, wherein the target uplink channel is used for transmitting part or all of information carried by the at least two uplink channels to be transmitted.

For example, when at least two types of uplink channels to be transmitted are overlapped within a target time unit, the terminal device may determine the target uplink channel based on the overlapping situation of the at least two uplink channels to be transmitted. The target time unit may include at least one of following: at least one sub-slot, at least one slot, at least one time domain symbol, at least one subframe, at least one time interval, and at least one radio frame. Of course, the at least two types of uplink channels may or may not be overlapped in a frequency domain, and this is not limited in the present disclosure.

The at least two uplink channels to be transmitted are multiplexing channels of the at least two types of uplink channels respectively. The target uplink channels may be multiplexing channels of the at least two uplink channels to be transmitted, or one of the at least two uplink channels to be transmitted, and this is not specifically limited in the present disclosure.

Based on the above technical solution, firstly, at least two uplink channels to be transmitted for multiplexing transmission may be determined based on at least two types of uplink channels. That is, a multiplexing transmission channel may be obtained for each type of uplink channels. Then whether further multiplexing transmission is needed may be determined based on the at least two uplink channels to be transmitted to realize a transmission mechanism of a two-step multiplexing determination.

Therefore, not only may actual transmission needs be guaranteed based on priorities of different types of uplink channels to improve a user experience, but also a probability of multiplexing the information carried by multiple uplink channels into one uplink channel for transmission may be reduced to improve a transmission performance and a success rate of data transmission. In addition, a judgment condition for multiplexing transmission may be simplified preferentially, and a complexity of the multiplexing transmission mechanism may be reduced.

In addition, the number of the at least two uplink channels to be transmitted is less than the number of uplink channels included in the at least two types of uplink channels. For example, the number of the at least two uplink channels to be transmitted is equal to the number of the at least two types of uplink channels, and the at least two uplink channels to be transmitted correspond to the at least two types of uplink channels one by one. That is, the number of the at least two uplink channels to be transmitted is equal to the number of the at least two types of uplink channels. Of course, the number of the at least two uplink channels to be transmitted may also be less or greater than the number of the at least two types of uplink channels, and this is not specifically limited in the present disclosure.

It should be noted that the overlapping of at least two types of uplink channels may mean that the at least two types of uplink channels are overlapped completely, or the at least two types of uplink channels are overlapped partially, or uplink channels in the at least two types of channels have an intersection in time domain resources, or multiple uplink channels overlapped partially or completely are formed by the at least two types of uplink channels. For example, it is assumed that the at least two types of uplink channels include a first type of uplink channels and a second type of uplink channels. Overlapping of the at least two types of uplink channels may mean that a certain uplink channel in the first type of uplink channels and a certain uplink channel in the second type of uplink channels are overlapped completely or partially. Overlapping of the at least two types of uplink channels may also mean that each uplink channel in the first type of uplink channels and each uplink channel in the second type of uplink channels are overlapped completely or partially.

It should be understood that each type of uplink channels in the at least two types of uplink channels may include one or more uplink channels, wherein the uplink channels may include, but are not limited to, Physical Random Access Channel (PRACH), Physical Uplink Control channel (PUCCH), Physical Uplink Shared channel (PUSCH), etc. Uplink reference signals may include uplink Demodulation Reference Signal (DMRS), Sounding Reference Signal (SRS), phase tracking reference signal (PT-RS), etc. The uplink DMRS may be used for uplink channel demodulation, SRS may be used for uplink channel measurement, uplink time-frequency synchronization or phase tracking, and PT-RS may also be used for uplink channel measurement, uplink time-frequency synchronization or phase tracking. It should be understood that implementations of the present disclosure may include uplink physical channels or uplink reference signals with same names as above and different functions from above, and may also include uplink physical channels or uplink reference signals with different names from above and same functions as above, and this is not limited by the present disclosure. The present disclosure does not limit a determination mode or division mode of the at least two types of uplink channels.

For example, the terminal device may receive indication information sent by the network device, wherein the indication information is used for indicating the at least two types of uplink channels. For example, the indication information may include information for indicating a channel priority and/or a channel type corresponding to each uplink channel in the at least two types of uplink channels. That is, after receiving the indication information, the terminal device may divide the overlapped multiple channels into at least two types of uplink channels based on the priority and/or channel type information of each uplink channel.

In other words, when multiple uplink channels are overlapped, the network device may send information for indicating the channel type corresponding to each of the multiple uplink channels to the terminal device. For example, when multiple uplink channels are overlapped, the network device may send the indication information to the terminal device.

For another example, different types of uplink channels in the at least two types of uplink channels correspond to different channel parameters. That is, the terminal device may divide the overlapped multiple channels into at least two types of uplink channels based on channel parameters. For example, the channel parameters include but are not limited to a channel duration and/or period.

For another example, different types of uplink channels in the at least two types of uplink channels are used for carrying information corresponding to different services. That is, the terminal device may divide the overlapped multiple channels into the at least two types of uplink channels based on a service type of information carried by the channels. For example, the at least two types of uplink channels may include a first type of uplink channels and a second type of uplink channels, wherein the first type of uplink channels may be used for carrying uplink information corresponding to URLLC and the second type of channels is used for carrying uplink information corresponding to eMBB.

The first type of channels may include at least one of the following channels: physical uplink control channel (PUCCH) carrying acknowledgement/non-acknowledgement ACK/NACK information corresponding to URLLC physical downlink shared channel (PDSCH); physical uplink shared channel (PUSCH) carrying URLLC; and PUCCH carrying a scheduling request (SR) corresponding to URLLC. The second type of channels includes at least one of the following channels: PUCCH or PUSCH carrying Channel State Information (CSI); PUSCH carrying eMBB; PUCCH carrying ACK/NACK information corresponding to eMBB PDSCH; and PUCCH carrying SR corresponding to eMBB.

It should be noted that the at least two uplink channels to be transmitted may be multiplexing channels of the at least two types of uplink channels respectively, and the determination mode of the at least two uplink channels to be transmitted may adopt a determination mode in a multiplexing transmission mechanism. For example, the terminal device may determine a uplink channel to be transmitted corresponding to each type of uplink channels according to a type of Uplink control information (UCI) and a channel format of Physical Uplink Control Channel (PUCCH).

For the convenience of understanding, implementation modes of determining a physical uplink channel for multiplexing transmission based on a type of information carried by multiple physical uplink channels will be described below.

1) CSI and CSI Multiplexing

If a network device configures PUCCH resources for multiple-CSI reporting in a slot for a terminal device through higher layer signaling, all CSI in the slot will be multiplexed onto a PUCCH resource for multiple-CSI reporting for transmission. If the network device does not configure PUCCH resources for multiple-CSI reporting, at most two periodic CSI reports with a high priority are sent in the slot, and PUCCH resources corresponding to the two periodic CSI reports are not overlapped in time domain, and at least one of the PUCCH resources is in PUCCH format 2.

2) CSI and SR Multiplexing

Resources for periodic CSI report and resources for Scheduling Request (SR) are both semi-statically configured. When PUCCHs carrying these two UCIs conflict, these two UCIs need to be multiplexed onto PUCCH resources for a periodic CSI report for transmission. In a case that PUCCH resources of K SRs and resources of a periodic SCI report have a conflict, the number of SR bits multiplexed and transmitted on PUCCH resources for a periodic CSI report is $\log_2 (K+1)$.

3) ACK/NACK and SR Multiplexing

When a multiplexing timing relationship is satisfied, two UCIs are multiplexed onto one PUCCH resource for transmission. That is, different formats of PUCCH carrying acknowledgements/non-acknowledgements (ACK/NACK) may correspond to different multiplexing modes.

For example, when a PUCCH of ACK/NACK is in format 0, if a value of the SR is negative, ACK/NACK is transmitted by using resources of PUCCH format 0 in a normal way. If the value of the SR is positive, ACK/NACK information transmitted by using resources of PUCCH format 0 according to a mapping relationship in table 1 and table 2.

TABLE 1

| HARQ-ACK Value | 0 | 1 |
|---|---|---|
| Sequence cyclic shift | $m_{CS} = 3$ | $m_{CS} = 9$ |

TABLE 2

| HARQ-ACK Value | {0, 0} | {0, 1} | {1, 1} | {1, 0} |
|---|---|---|---|---|
| Sequence cyclic shift | $m_{CS} = 1$ | $m_{CS} = 4$ | $m_{CS} = 7$ | $m_{CS} = 10$ |

For another example, when PUCCH of ACK/NACK is of format 1 and PUCCH carrying SR is also of format 1, if SR is negative, the ACK/NACK information is transmitted by using resources of PUCCH of format 1 corresponding to ACK/NACK. If SR is positive, the ACK/NACK information is transmitted by using resources of PUCCH of format 1 corresponding to SR.

For another example, when PUCCH of ACK/NACK is of format 1 and PUCCH carrying SR is of format 0, ACK/NACK information is transmitted on resources of PUCCH of format 1 corresponding to ACK/NACK, and SR information is not transmitted.

In another example, when PUCCH of ACK/NACK is of format 2/3/4, if PUCCH resources of K SRs conflict with PUCCH resources carrying ACK/NACK, the number of SR bits multiplexed and transmitted on PUCCH resources of ACK/NACK is $\log_2 (K+1)$.

4) ACK/NACK, SR and CSI Multiplexing

If a multiplexing timing relationship is satisfied, all of UCI is multiplexed on one PUCCH resource for transmission, and this PUCCH resource is determined according to the total number of bits of UCI after multiplexing, that is, the PUCCH resource is determined according to a PUCCH resource indication field in downlink control signaling.

5) PUCCH and PUSCH Multiplexing

ACK/NACK and CSI carried in PUCCH will be multiplexed in PUSCH for transmission after a multiplexing timing relationship is satisfied. Since Buffer State Report (BSR) will be reported in a header of an MAC layer of the PUSCH, this information may indicate whether the terminal device has data to upload after this PUSCH. In terms of function, it is similar to SR function, so it is unnecessary to report SR information repeatedly.

In some implementations of the present disclosure, the at least two uplink channels to be transmitted are not overlapped, and at this time, the target uplink channels include the at least two uplink channels to be transmitted. That is, the terminal device may transmit the at least two uplink channels to be transmitted to the network device. For example, the terminal device transmits the at least two uplink channels to be transmitted to the network device within a target time unit.

In other words, the at least two uplink channels to be transmitted may not adopt a multiplexing transmission mechanism.

Or, after obtaining at least two uplink channels to be transmitted by using the multiplexing transmission solution for the at least two types of uplink channels, the obtained at least two uplink channels to be transmitted may not be overlapped in the time domain, and may be directly transmitted at this time without using an additional multiplexing transmission mechanism, thus avoiding information loss and transmission performance penalty.

In other implementations of the present disclosure, when the at least two uplink channels to be transmitted are overlapped, the target uplink channel only includes one uplink channel. That is, the terminal device may send part or all of the information carried by the at least two uplink channels to be transmitted to the network device through the one uplink channel.

In other words, the at least two uplink channels to be transmitted need to adopt a multiplexing transmission mechanism.

Or, after obtaining at least two uplink channels to be transmitted by using the multiplexing transmission solution for the at least two types of uplink channels, an uplink channel which may be used for transmission may be further obtained by using the multiplexing transmission solution for the at least two uplink channels to be transmitted, which may reduce a complexity of determination by terminal.

For example, the terminal device may directly determine the first uplink channel to be transmitted in the at least two uplink channels to be transmitted as the target uplink channel. For example, time domain symbols occupied by the target uplink channel are not used to transmit uplink channels other than the first uplink channel to be transmitted in the at least two uplink channels to be transmitted.

The first uplink channel to be transmitted may be an uplink channel with a highest priority in the at least two uplink channels to be transmitted. The terminal device may determine a priority of each uplink channel to be transmitted of the at least two uplink channels to be transmitted based on channel parameters, wherein the channel parameters include but are not limited to a channel duration and/or period. The terminal device may also determine the priority of each uplink channel to be transmitted of the at least two uplink channels to be transmitted based on a type of a service carried by the channel. Of course, the first uplink channel to be transmitted may also be an uplink channel with a smallest or largest data amount, and this is not limited in the present disclosure. It should be understood that an expression form of the priority of the first uplink channel to be transmitted is not limited in the present disclosure. For example, the priority of the first uplink channel to be transmitted may be reflected in an explicit way (such as priority parameters) or an implicit way. For example, a protocol stipulates that when the first uplink channel to be transmitted is overlapped with the second uplink channel to be transmitted, the first uplink channel to be transmitted is transmitted, it implicitly indicates that the priority of the first uplink channel to be transmitted is higher than that of the second uplink channel to be transmitted.

For another example, the target uplink channel may also be determined according to the information carried by the at least two uplink channels to be transmitted. For example, the terminal device may determine the target uplink channel according to part of the information carried by the at least two uplink channels to be transmitted. Specifically, the terminal device may determine auxiliary information according to all or part of the information carried by the at least two uplink channels to be transmitted, and then determine uplink channels that may be used for multiplexing transmission based on the auxiliary information. The auxiliary information may include but is not limited to size of information bits, load information, resource information, information type and the like.

It should be noted that when the at least two uplink channels to be transmitted need to adopt a multiplexing transmission mechanism to determine a target uplink channel that may be used for multiplexing transmission, the information that may be carried by the target uplink channel is not specifically restricted in the implementations of the present disclosure.

For example, the information carried in the target uplink channel includes all of the information carried by the first uplink channel to be transmitted in the at least two uplink channels to be transmitted; or part of information carried by uplink channels except the first uplink channel to be transmitted in the at least two uplink channels to be transmitted. Preferably, the information carried by the target uplink channel only includes all of the information carried by the first uplink channel to be transmitted.

In addition, when the target uplink channel is an uplink channel for multiplexing transmission, the target uplink channel may be an uplink channel in the at least two uplink channels to be transmitted or an uplink channel other than the at least two uplink channels to be transmitted, and this is not limited in the present disclosure. Optionally, the target uplink channel and the at least two uplink channels to be transmitted belong to a same time unit (such as slot or sub-slot).

Relationships between at least two types of uplink channels, at least two uplink channels to be transmitted, and a target uplink channel according to the implementations of the present disclosure will be explained below with reference to FIG. 3 to FIG. 6.

Figure 3:
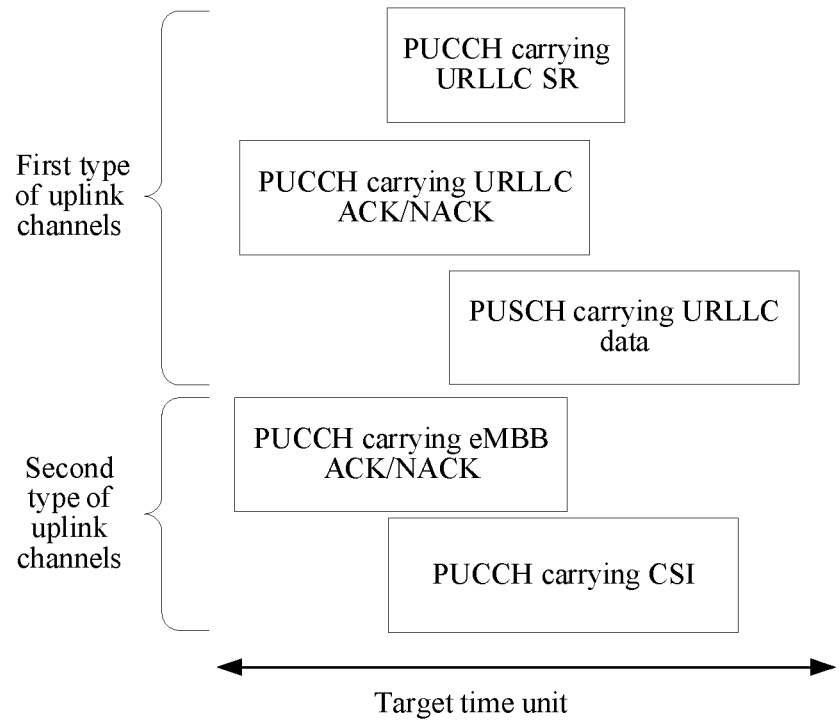
FIG. 3 is a schematic block diagram of at least two types of uplink channels of an implementation of the present disclosure.

FIG. 3 illustrates an example of a first type uplink channel and a second type uplink channel according to an implementation of the present disclosure.

As shown in FIG. 3, the first type of uplink channels may include PUCCH carrying URLLC SR, PUCCH carrying URLLC ACK/NACK and PUSCH carrying URLLC data. The second type of uplink channels may include PUCCH carrying eMBB ACK/NACK and PUCCH carrying CSI. The first type of uplink channels are overlapped with the second type of uplink channels. At this time, the terminal device may determine a first uplink channel to be transmitted for the first type of uplink channels and a second uplink channel to be transmitted for the second type of uplink channels.

Figure 4:
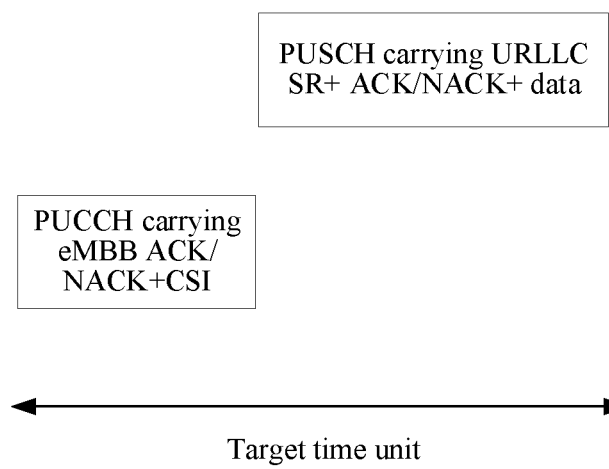
FIG. 4 is a schematic block diagram of a positional relationship of at least two uplink channels to be transmitted of an implementation of the present disclosure.

FIG. 4 is a schematic diagram showing that the first uplink channel to be transmitted is not overlapped with the second uplink channel to be transmitted.

As shown in FIG. 4, the first uplink channel to be transmitted may be PUSCH carrying URLLC SR+ ACK/NACK+ data, and the second uplink channel to be transmitted may be PUCCH carrying eMBB ACK/NACK+CSI, and the first uplink channel to be transmitted and the second uplink channel to be transmitted are not overlapped.

In this case, the terminal device does not need to use an additional multiplexing transmission mechanism, and may directly transmit the first uplink channel to be transmitted and the second uplink channel to be transmitted to the network device within the target time unit.

Figure 5:
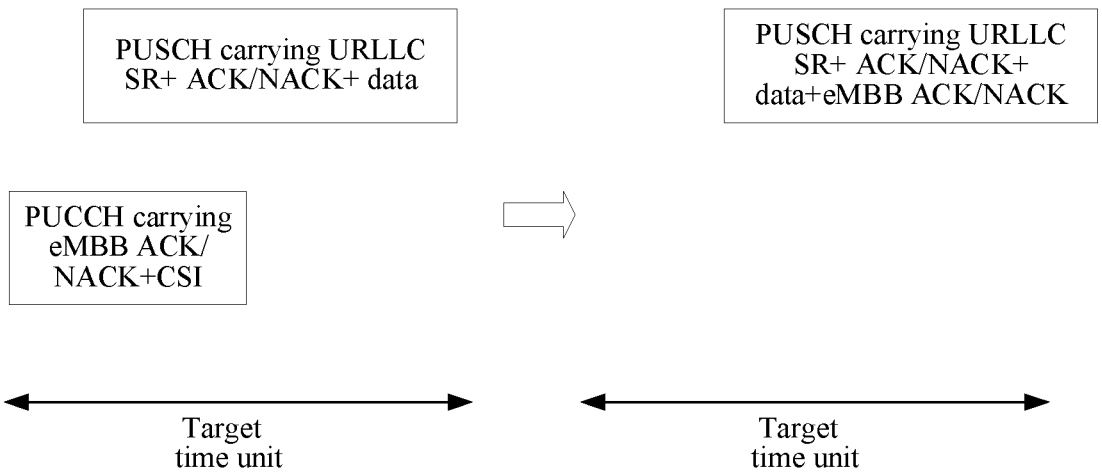
FIG. 5 is a schematic block diagram of a positional relationship between at least two uplink channels to be transmitted and a target uplink channel of an implementation of the present disclosure.

FIG. 5 is a schematic diagram showing the overlapping of a first uplink channel to be transmitted and a second uplink channel to be transmitted.

As shown in FIG. 5, the first uplink channel to be transmitted may be PUSCH carrying URLLC SR+ ACK/NACK+ data, the second uplink channel to be transmitted may be PUCCH carrying eMBB ACK/NACK+CSI, and the first uplink channel to be transmitted and the second uplink channel to be transmitted are overlapped partially.

In this case, the terminal device needs to obtain a target uplink channel for transmission by using a multiplexing transmission solution for the first uplink channel to be transmitted and the second uplink channel to be transmitted. The target uplink channel may carry all of information of the first uplink channel to be transmitted and part of information of the second uplink channel to be transmitted. For example, the target uplink channel may be PUSCH carrying URLLC SR+ ACK/NACK+ data+ eMBB ACK/NACK.

Figure 6:
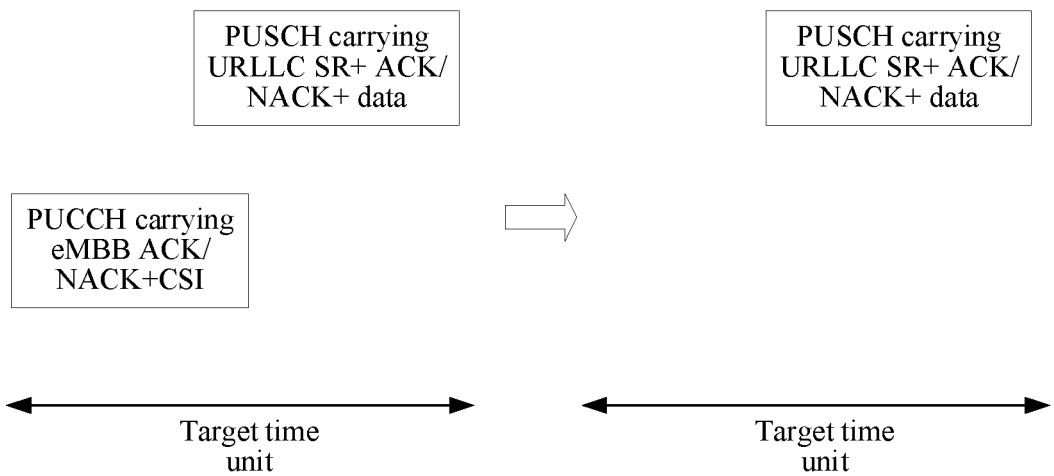
FIG. 6 is another schematic block diagram of a positional relationship between at least two uplink channels to be transmitted and a target uplink channel of an implementation of the present disclosure.

FIG. 6 is a schematic diagram showing the overlapping of a first uplink channel to be transmitted and a second uplink channel to be transmitted.

As shown in FIG. 6, the first uplink channel to be transmitted may be PUSCH carrying URLLC SR+ ACK/NACK+ data, the second uplink channel to be transmitted may be PUCCH carrying eMBB ACK/NACK+CSI, and the first uplink channel to be transmitted and the second uplink channel to be transmitted are overlapped partially.

In this case, the terminal device needs to obtain a target uplink channel for transmission by using a multiplexing transmission solution for the first uplink channel to be transmitted and the second uplink channel to be transmitted, and the target uplink channel may only carry all of information of the first uplink channel to be transmitted. For example, the target uplink channel may be PUSCH carrying URLLC SR+ ACK/NACK+ data.

It should be noted that when multiplexing transmission is performed for overlapped multiple PUCCHs or PUCCHs and PUSCHs, they need to satisfy a certain timing relationship. Otherwise, the terminal device will determine the overlapped multiple PUCCHs or PUCCHs and PUSCH as an abnormal condition. The timing relationship is mainly to ensure that the terminal device has enough time to determine whether information carried by different uplink channels needs to be multiplexed, and time needed for UCI concatenation and coding during multiplexing transmission.

The timing relationship may refer to a time difference between an uplink channel and its corresponding downlink channel.

For example, when there is a channel carrying ACK/NACK information in the overlapped channels, a time difference between a first time domain symbol of a channel transmitted earliest in the overlapped channels and a last time domain symbol of PDSCH corresponding to ACK/NACK information is not less than $N_1+d_{1,1}+1$ time domain symbols, wherein $N_1$ is a PDSCH processing time determined according to processing capability information reported by the terminal. $d_{1,1}$ is a value predetermined by a protocol and is related to an allocation situation of PDSCH resources. Please see section 5.3 of TS38.214 for details.

For another example, when there is a channel carrying ACK/NACK information corresponding to DCI indicating SPS PDSCH release in the overlapped channels, a time difference between a first time domain symbol of a channel transmitted earliest in the overlapped channels and a last time domain symbol of PDCCH carrying DCI indicating SPS PDSCH release is not less than N+1 time domain symbols, wherein a value of N is predetermined by a protocol and is related to a subcarrier spacing size and a processing capacity reported by the terminal device.

For another example, when there is a PUSCH in the overlapped channels, and there is no aperiodic CSI reporting in the PUSCH, a time difference between a first time domain symbol of a channel transmitted earliest in the overlapped channels and a last time domain symbol of the PDCCH is not less than $N_2+d_{2,1}+1$ time domain symbols, wherein $N_2$ is a processing time of the PUSCH determined according to processing capability information reported by the terminal, and a value of $d_{2,1}$ is predetermined by the protocol.

The PDCCH may be any one of the following: PDCCH carrying DCI for scheduling the PUSCH, and PDCCH scheduling PDSCH or indicating SPS PDSCH release, wherein the corresponding ACK/NACK information for indicating SPS PDSCH release or the scheduled PDSCH is transmitted through PUCCH in the overlapped channels.

For another example, when there is a PUSCH in the overlapped channels and there is a periodic CSI reporting in the PUSCH, a time difference between a first time domain symbol of a channel transmitted earliest in the overlapped channels and a last time domain symbol of the PDCCH is not less than Z+d time domain symbols, wherein Z is a CSI calculation time determined according to the processing capability information reported by the terminal, and a value of d is predetermined by a protocol.

In some implementations of the present disclosure, the at least two types of uplink channels and downlink channels corresponding to the at least two types of uplink channels satisfy a certain timing relationship to ensure that the at least two types of uplink channels may transmit information carried by the at least two types of uplink channels by multiplexing the at least two uplink channels to be transmitted.

For example, a time difference between one of uplink channels in the at least two types of uplink channels and one of downlink channels corresponding to the at least two types of uplink channels satisfies a first timing relationship. For example, a time difference between one of uplink channels in the at least two types of uplink channels and a last downlink channel in at least one downlink channel corresponding to each type of uplink channels satisfies the first timing relationship.

That is, the terminal device needs to determine the first timing relationship based on a type of uplink channels with a highest priority in the at least two types of uplink channels.

For example, since channels corresponding to a URLLC service and channels corresponding to an eMBB service need to be determined uniformly, at this time, calculating values of parameters of the timing relationship needs to refer to parameters of a certain type of uplink channels, such as parameters of channels corresponding to the URLLC, that is, values of $N_1$, $N_2$ in the formula mentioned above are values for the URLLC service.

For another example, a time difference between one of uplink channels in each type of uplink channels of the at least two types of uplink channels and one of downlink channels corresponding to a same type of uplink channels satisfies a second timing relationship. For example, a time difference between one of uplink channels in each type of uplink channels of the at least two types of uplink channels and a last downlink channel in at least one downlink channel corresponding to the same type of uplink channels satisfies the second timing relationship.

That is, the terminal device needs to determine the second timing relationship based on the same type of uplink channels.

For example, for uplink channels corresponding to the URLLC service, values of $N_1$, $N_2$ in the formula mentioned above may be values for the URLLC service. For uplink channels corresponding to the eMBB service, values of $N_1$, $N_2$ in the formula mentioned above may be values for the eMBB service.

In some implementations of the present disclosure, the at least two uplink channels to be transmitted and downlink channels corresponding to the at least two uplink channels to be transmitted need to satisfy a certain timing relationship to ensure that the at least two uplink channels to be transmitted may transmit information carried by the two uplink channels to be transmitted by multiplexing a target uplink channel.

For example, a time difference between one of uplink channels in the at least two uplink channels to be transmitted and one of downlink channels corresponding to the at least two types of uplink channels satisfies a third timing relationship. That is, the terminal device needs to determine the third timing relationship based on a type of uplink channels with a highest priority in the at least two types of uplink channels.

Of course, when the time difference between one of uplink channels in the at least two uplink channels to be transmitted and one of downlink channels corresponding to the at least two types of uplink channels does not satisfy the third timing relationship, the terminal device may transmit only one of the at least two uplink channels to be transmitted. For example, the terminal device may only transmit a first uplink channel to be transmitted in the at least two uplink channels to be transmitted. Further, a second uplink channel to be transmitted is not transmitted on time domain resources occupied by the first uplink channel to be transmitted. That is, the first uplink channel to be transmitted is determined to be transmitted, and the second uplink channel to be transmitted stops transmitting or is completely discarded.

Preferred implementations of the present disclosure have been described in detail above with reference to the accompanying drawings, but the present disclosure is not limited to the specific details of the above implementations. Within the technical conception of the present disclosure, various simple modifications may be made to the technical solution of the present disclosure, which all belong to the protection scope of the present disclosure.

For example, the specific technical features described in the above specific implementations may be combined in any suitable way in case of no contradiction. In order to avoid unnecessary repetition, various possible combination ways will not be explained in the present disclosure.

For another example, various implementations of the present disclosure may be combined arbitrarily, as long as they do not violate the idea of the present disclosure, they should also be regarded as the contents disclosed in the present disclosure.

It should be understood that sequence numbers of the foregoing processes do not mean an execution order in various implementations of the present disclosure. The execution order of the processes should be determined according to functions and internal logics of the processes, and should not be construed as any limitation on the implementation processes of the implementations of the present disclosure.

As shown in FIG. 2, the method 200 may further include acts S220 and S240.

S220, if at least two types of uplink channels to be transmitted are overlapped, the network device determines a target uplink channel based on an overlapping situation of at least two types of uplink channels to be transmitted, wherein the at least two types of uplink channels to be transmitted are respectively used for transmitting part or all of information carried by the at least two types of uplink channels.

S240, the network device receives the target uplink channel transmitted by the terminal device, wherein the target uplink channel is used for transmitting part or all of information carried by the at least two uplink channels to be transmitted.

In some implementations of the present disclosure, if the at least two uplink channels to be transmitted are not overlapped, the target uplink channels include the at least two uplink channels to be transmitted.

In some implementations of the present disclosure, if the at least two uplink channels to be transmitted are overlapped, the target uplink channel only includes one uplink channel.

In some implementations of the present disclosure, the network device may determine a first uplink channel to be transmitted in the at least two uplink channels to be transmitted as the target uplink channel.

In some implementations of the present disclosure, the time domain symbols occupied by the target uplink channel are not used to transmit uplink channels except the first uplink channel to be transmitted in the at least two uplink channels to be transmitted.

In some implementations of the present disclosure, the network device may determine the target uplink channel according to the information carried by the at least two uplink channels to be transmitted.

In some implementations of the present disclosure, the network device may determine the target uplink channel according to part of the information carried by the at least two uplink channels to be transmitted.

In some implementations of the present disclosure, the information carried in the target uplink channel includes:

all of information carried by the first uplink channel to be transmitted in the at least two uplink channels to be transmitted; or part of information carried by uplink channels except the first uplink channel to be transmitted in the at least two uplink channels to be transmitted.

In some implementations of the present disclosure, the information carried by the target uplink channel only includes all of the information carried by the first uplink channel to be transmitted.

In some implementations of the present disclosure, the first uplink channel to be transmitted is an uplink channel with a highest priority in the at least two uplink channels to be transmitted.

In some implementations of the present disclosure, the time difference between one of uplink channels in the at least two types of uplink channels and one of downlink channels corresponding to the at least two types of uplink channels satisfies a first timing relationship.

In some implementations of the present disclosure, the network device may determine the first timing relationship based on a type of uplink channels with the highest priority in the at least two types of uplink channels.

In some implementations of the present disclosure, the time difference between one of uplink channels in each type of uplink channels of the at least two types of uplink channels and one of downlink channels corresponding to the same type of uplink channels satisfies the second timing relationship.

In some implementations of the present disclosure, the network device may determine the second timing relationship based on the same type of uplink channels.

In some implementations of the present disclosure, the time difference between one of uplink channels in the at least two uplink channels to be transmitted and one of downlink channels corresponding to the at least two types of uplink channels satisfies a third timing relationship.

In some implementations of the present disclosure, the time difference between one of uplink channels in the at least two uplink channels to be transmitted and one of downlink channels corresponding to the at least two types of uplink channels does not satisfy the third timing relationship.

In some implementations of the present disclosure, the network device may determine the third timing relationship based on a type of uplink channels with the highest priority in the at least two types of uplink channels.

In some implementations of the present disclosure, the network device may send indication information to the terminal device, wherein the indication information is used for indicating the at least two types of uplink channels.

In some implementations of the present disclosure, the indication information includes information for indicating a channel priority and/or a channel type corresponding to each uplink channel in the at least two types of uplink channels.

In some implementations of the present disclosure, different types of uplink channels in the at least two types of uplink channels correspond to different channel parameters.

In some implementations of the present disclosure, the channel parameters include a channel duration and/or period.

In some implementations of the present disclosure, different types of uplink channels in the at least two types of uplink channels are used for carrying information corresponding to different services.

In some implementations of the present disclosure, the at least two types of uplink channels include a first type of uplink channels and a second type of uplink channels, wherein the first type of uplink channels are used for carrying uplink information corresponding to Ultra-Reliable and Low Latency Communication (URLLC), and the second type of channels are used for carrying uplink information corresponding to Enhance Mobile Broadband (eMBB).

In some implementations of the present disclosure, the first type of channels include at least one of the following channels:

physical uplink control channel (PUCCH) carrying acknowledgement/non-acknowledgement (ACK/NACK) information corresponding to URLLC physical downlink shared channel (PDSCH);

physical uplink shared channel (PUSCH) carrying URLLC; and

PUCCH carrying scheduling request (SR) corresponding to the URLLC.

In some implementations of the present disclosure, the second type of channels include at least one of the following channels:

PUCCH or PUSCH carrying channel state information (CSI);

PUSCH bearing eMBB;

PUCCH carrying ACK/NACK information corresponding to eMBB PDSCH; and

PUCCH carrying SR corresponding to eMBB.

In some implementations of the present disclosure, a number of the at least two uplink channels to be transmitted is less than a number of uplink channels included in the at least two types of uplink channels.

In some implementations of the present disclosure, the number of the at least two uplink channels to be transmitted is equal to the number of the at least two types of uplink channels, and the at least two uplink channels to be transmitted correspond to the at least two types of uplink channels one by one.

It should be understood that S220 and S210 in the method 200 are executed by the terminal device and the network device respectively, but their specific implementation modes may be similar or even the same, so they will not be described here for brevity.

Method implementations of the present disclosure are described in details above in combination with FIG. 1 to FIG. 6. Device implementations of the present disclosure are described in details below in combination with FIG. 7 to FIG. 10.

Figure 7:
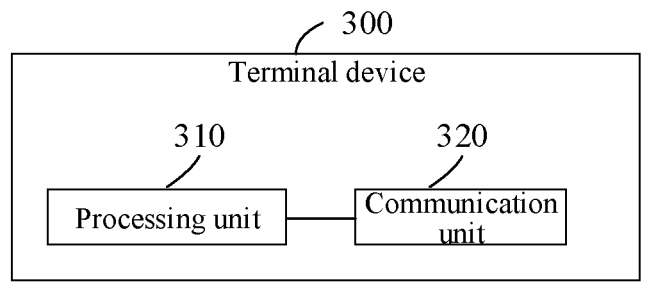
FIG. 7 is a schematic block diagram of a terminal device of an implementation of the present disclosure.

FIG. 7 is a schematic block diagram of a terminal device 300 according to an implementation of the present disclosure.

As shown in FIG. 7, the terminal device 300 may include: a processing unit 310 and a communication unit 320.

The processing unit 310 is configured to determine a target uplink channel based on an overlapping situation of at least two uplink channels to be transmitted if at least two types of uplink channels to be transmitted are overlapped, wherein the at least two uplink channels to be transmitted are respectively used for transmitting part or all of information carried by the at least two types of uplink channels.

The communication unit 320 is configured to transmit the target uplink channel, wherein the target uplink channel is used for transmitting part or all of the information carried by the at least two uplink channels to be transmitted.

In some implementations of the present disclosure, if the at least two uplink channels to be transmitted are not overlapped, the target uplink channels include the at least two uplink channels to be transmitted.

In some implementations of the present disclosure, if the at least two uplink channels to be transmitted are overlapped, the target uplink channel only includes one uplink channel.

In some implementations of the present disclosure, the processing unit 310 is specifically configured to: determine a first uplink channel to be transmitted in the at least two uplink channels to be transmitted as the target uplink channel.

In some implementations of the present disclosure, time domain symbols occupied by the target uplink channel are not used to transmit uplink channels except the first uplink channel to be transmitted in the at least two uplink channels to be transmitted.

In some implementations of the present disclosure, the processing unit 310 is specifically configured to: determine the target uplink channel according to the information carried by the at least two uplink channels to be transmitted.

In some implementations of the present disclosure, the processing unit 310 is further specifically configured to: determine the target uplink channel according to part of the information carried by the at least two uplink channels to be transmitted.

In some implementations of the present disclosure, the information carried in the target uplink channel includes:

all of information carried by the first uplink channel to be transmitted in the at least two uplink channels to be transmitted; or part of information carried by uplink channels except the first uplink channel to be transmitted in the at least two uplink channels to be transmitted.

In some implementations of the present disclosure, the information carried by the target uplink channel only includes all of the information carried by the first uplink channel to be transmitted.

In some implementations of the present disclosure, the first uplink channel to be transmitted is an uplink channel with a highest priority in the at least two uplink channels to be transmitted.

In some implementations of the present disclosure, a time difference between one of uplink channels in the at least two types of uplink channels and downlink channels corresponding to the at least two types of uplink channels satisfies a first timing relationship.

In some implementations of the present disclosure, the processing unit 310 is further configured to: determine the first timing relationship based on a type of uplink channels with the highest priority in the at least two types of uplink channels.

In some implementations of the present disclosure, a time difference between one of uplink channels in each type of uplink channels of the at least two types of uplink channels and one of downlink channels corresponding to a same type of uplink channels satisfies a second timing relationship.

In some implementations of the present disclosure, the processing unit 310 is further configured to: determine the second timing relationship based on the same type of uplink channels.

In some implementations of the present disclosure, a time difference between one of uplink channels in the at least two uplink channels to be transmitted and one of downlink channels corresponding to the at least two types of uplink channels satisfies a third timing relationship.

In some implementations of the present disclosure, the time difference between one of uplink channels in the at least two uplink channels to be transmitted and one of downlink channels corresponding to the at least two types of uplink channels does not satisfy the third timing relationship.

In some implementations of the present disclosure, the processing unit 310 is further configured to: determine the third timing relationship based on a type of uplink channels with the highest priority in the at least two types of uplink channels.

In some implementations of the present disclosure, the communication unit 320 is further configured to: receive indication information sent by the network device, wherein the indication information is used for indicating the at least two types of uplink channels.

In some implementations of the present disclosure, the indication information includes information for indicating a channel priority and/or a channel type corresponding to each uplink channel in the at least two types of uplink channels.

In some implementations of the present disclosure, different types of uplink channels in the at least two types of uplink channels correspond to different channel parameters.

In some implementations of the present disclosure, the channel parameters include a channel duration and/or period.

In some implementations of the present disclosure, different types of uplink channels in the at least two types of uplink channels are used for carrying information corresponding to different services.

In some implementations of the present disclosure, the at least two types of uplink channels include a first type of uplink channels and a second type of uplink channels, wherein the first type of uplink channels are used for carrying uplink information corresponding to Ultra-Reliable and Low Latency Communication (URLLC), and the second type of channels are used for carrying uplink information corresponding to Enhance Mobile Broadband (eMBB).

In some implementations of the present disclosure, the first type of channels includes at least one of the following channels:

physical uplink control channel (PUCCH) carrying acknowledgement/non-acknowledgement (ACK/NACK) information corresponding to a URLLC physical downlink shared channel (PDSCH);

physical uplink shared channel (PUSCH) carrying URLLC; and

PUCCH carrying scheduling request (SR) corresponding to the URLLC.

In some implementations of the present disclosure, the second type of channels include at least one of the following channels:

PUCCH or PUSCH carrying channel state information (CSI);

PUSCH carrying eMBB;

PUCCH carrying ACK/NACK information corresponding to eMBB PDSCH; and

PUCCH carrying SR corresponding to eMBB.

In some implementations of the present disclosure, the number of the at least two uplink channels to be transmitted is less than the number of uplink channels included in the at least two types of uplink channels.

In some implementations of the present disclosure, the number of the at least two uplink channels to be transmitted is equal to the number of the at least two types of uplink channels, wherein the at least two uplink channels to be transmitted correspond to the at least two types of uplink channels one by one.

It should be understood that the device implementations and the method implementations may correspond to each other, and description of the device implementations may refer to the similar description of the method implementations. Specifically, the terminal device 300 shown in FIG. 7 may correspond to a corresponding subject performing the method 200 in an implementation of the present disclosure, and the above and other operations and/or functions of various units in the terminal device 300 are respectively for realizing corresponding flows of the method in FIG. 2, and this will not be repeated here for the sake of brevity.

Figure 8:
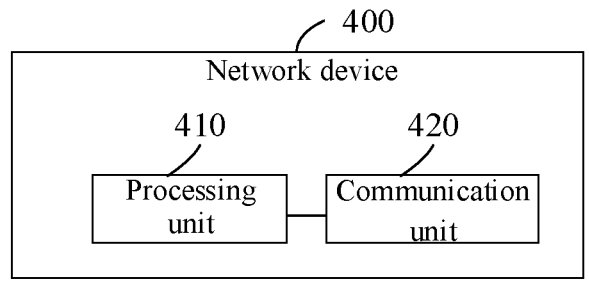
FIG. 8 is a schematic block diagram of a network device of an implementation of the present disclosure.

FIG. 8 is a schematic block diagram of a network device 400 according to an implementation of the present disclosure.

As shown in FIG. 8, the network device 400 includes: a processing unit 410 and a communication unit 420.

The processing unit 410 is configured to determine a target uplink channel based on an overlapping situation of at least two uplink channels to be transmitted if at least two types of uplink channels to be transmitted are overlapped, wherein the at least two uplink channels to be transmitted are respectively used for transmitting part or all of information carried by the at least two types of uplink channels.

The communication unit 420 is configured to receive the target uplink channel, wherein the target uplink channel is used for transmitting part or all of the information carried by the at least two uplink channels to be transmitted.

In some implementations of the present disclosure, if the at least two uplink channels to be transmitted are not overlapped, the target uplink channels include the at least two uplink channels to be transmitted.

In some implementations of the present disclosure, if the at least two uplink channels to be transmitted are overlapped, the target uplink channel only includes one uplink channel.

In some implementations of the present disclosure, the processing unit 410 is specifically configured to: determine a first uplink channel to be transmitted in the at least two uplink channels to be transmitted as the target uplink channel.

In some implementations of the present disclosure, time domain symbols occupied by the target uplink channel are not used to transmit uplink channels except the first uplink channel to be transmitted in the at least two uplink channels to be transmitted.

In some implementations of the present disclosure, the processing unit 410 is specifically configured to: determine the target uplink channel according to the information carried by the at least two uplink channels to be transmitted.

In some implementations of the present disclosure, the processing unit 410 is more specifically configured to: determine the target uplink channel according to part of the information carried by the at least two uplink channels to be transmitted.

In some implementations of the present disclosure, the information carried in the target uplink channel includes:

all of the information carried by the first uplink channel to be transmitted in the at least two uplink channels to be transmitted; or part of the information carried by uplink channels except the first uplink channel to be transmitted in the at least two uplink channels to be transmitted.

In some implementations of the present disclosure, the information carried by the target uplink channel only includes all of the information carried by the first uplink channel to be transmitted.

In some implementations of the present disclosure, the first uplink channel to be transmitted is an uplink channel with a highest priority in the at least two uplink channels to be transmitted.

In some implementations of the present disclosure, a time difference between one of uplink channels in the at least two types of uplink channels and one of downlink channels corresponding to the at least two types of uplink channels satisfies a first timing relationship.

In some implementations of the present disclosure, the processing unit 410 is further configured to: determine the first timing relationship based on a type of uplink channel with the highest priority in the at least two types of uplink channels.

In some implementations of the present disclosure, a time difference between one of uplink channels in each type of uplink channels of the at least two types of uplink channels and downlink channels corresponding to a same type of uplink channels satisfies the second timing relationship.

In some implementations of the present disclosure, the processing unit 410 is further configured to: determine the second timing relationship based on the same type of uplink channels.

In some implementations of the present disclosure, a time difference between one of uplink channels in the at least two uplink channels to be transmitted and one of downlink channels corresponding to the at least two types of uplink channels satisfies a third timing relationship.

The time difference between one of uplink channels in the at least two uplink channels to be transmitted and one of downlink channels corresponding to the at least two types of uplink channels does not satisfy the third timing relationship.

In some implementations of the present disclosure, the processing unit 410 is further configured to: determine the third timing relationship based on a type of uplink channels with the highest priority in the at least two types of uplink channels.

In some implementations of the present disclosure, the communication unit 420 is further configured to: send indication information to terminal device, wherein the indication information is used for indicating the at least two types of uplink channels.

In some implementations of the present disclosure, the indication information includes information for indicating a channel priority and/or a channel type corresponding to each uplink channel in the at least two types of uplink channels.

In some implementations of the present disclosure, different types of uplink channels in the at least two types of uplink channels correspond to different channel parameters.

In some implementations of the present disclosure, the channel parameters include a channel duration and/or period.

In some implementations of the present disclosure, different types of uplink channels in the at least two types of uplink channels are used for carrying information corresponding to different services.

In some implementations of the present disclosure, the at least two types of uplink channels include a first type of uplink channels and a second type of uplink channels, wherein the first type of uplink channels are used for carrying uplink information corresponding to Ultra-Reliable and Low Latency Communication (URLLC), and the second type of channels is used for carrying uplink information corresponding to Enhance Mobile Broadband (eMBB).

In some implementations of the present disclosure, the first type of channels include at least one of the following channels:

physical uplink control channel (PUCCH) carrying acknowledgement/non-acknowledgement (ACK/NACK) information corresponding to a URLLC physical downlink shared channel (PDSCH);

physical uplink shared channel (PUSCH) carrying URLLC; and PUCCH carrying scheduling request (SR) corresponding to the URLLC.

In some implementations of the present disclosure, the second type of channels includes at least one of the following channels:

PUCCH or PUSCH carrying channel state information (CSI);

PUSCH bearing eMBB;

PUCCH carrying ACK/NACK information corresponding to eMBB PDSCH; and

PUCCH carrying SR corresponding to eMBB.

In some implementations of the present disclosure, the number of the at least two uplink channels to be transmitted is less than the number of uplink channels included in the at least two types of uplink channels.

In some implementations of the present disclosure, the number of the at least two uplink channels to be transmitted is equal to the number of the at least two types of uplink channels, and the at least two uplink channels to be transmitted correspond to the at least two types of uplink channels one by one.

It should be understood that the device implementations and the method implementations may correspond to each other, and description of the device implementations may refer to similar description of the method implementations. It should be understood that the network device 400 shown in FIG. 8 may correspond to a corresponding subject performing the method 200 in an implementation of the present disclosure, and the above and other operations and/or functions of various units in the terminal device 400 are respectively for realizing corresponding flows of the method in FIG. 2, and this will not be repeated here for the sake of brevity.

In the above, the communication device according to an implementation of the present disclosure is described from the perspective of functional modules with reference to FIG. 7 and FIG. 8. It should be understood that the functional module may be realized by hardware, instructions in the form of software, or a combination of hardware and software modules.

Specifically, each act of the method implementation in the implementations of the present disclosure may be completed by hardware integrated logic circuits and/or instructions in the form of software in the processor, and the acts of the method disclosed in combination with an implementation of the present disclosure may be directly embodied as being executed by a hardware decoding processor, or by a combination of hardware and software modules in the decoding processor.

The software modules may be located in a storage medium commonly used in the art, such as a random access memory, a flash memory, a read-only memory, a programmable read-only memory, an electrically erasable programmable memory, or a register. The storage medium is located in the memory, and the processor reads the information in the memory and completes the acts of the above method implementations in combination with its hardware.

For example, the above-mentioned processing unit may be implemented by a processor, and the above-mentioned communication unit may be implemented by a transceiver.

Figure 9:
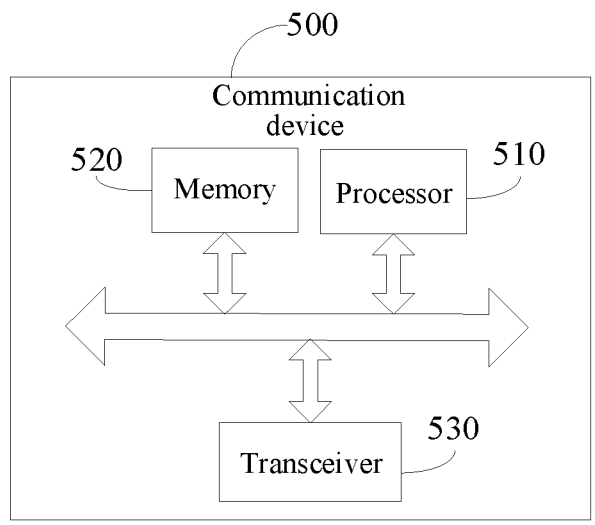
FIG. 9 is a schematic block diagram of a communication device of an implementation of the present disclosure.

FIG. 9 is a schematic structural diagram of a communication device 500 according to an implementation of the present disclosure.

As shown in FIG. 9, the communication device 500 includes a processor 510. The processor 510 may call and run a computer program from a memory to implement the method in an implementation of the present disclosure.

In some implementations of the present disclosure, the communication device 500 may further include a memory 520. The memory 520 may be configured to store indication information, also may be configured to store codes, instructions, etc., executed by the processor 510. The processor 510 may call and run a computer program from the memory 520 to implement the method in an implementation of the present disclosure.

The memory 520 may be a separate device independent of the processor 510 or may be integrated in the processor 510.

In some implementations of the present disclosure, the communication device 500 may further include a transceiver 530, and the processor 510 may control the transceiver 530 to communicate with other devices. Specifically, the transceiver 530 may send information or data to other devices or receive information or data sent by other devices.

The transceiver 530 may include a transmitter and a receiver. The transceiver 530 may further include antennas, and the number of antennas may be one or more.

In other implementations of the present disclosure, the communication device 500 may be a terminal device in an implementation of the present disclosure, and the communication device 500 may implement the corresponding processes implemented by the terminal device in various methods in the implementations of the present disclosure. That is to say, the communication device 500 in an implementation of the present disclosure may correspond to the terminal device 300 in an implementation of the present disclosure, and may correspond to a corresponding subject performing the method 200 in an implementation of the present disclosure, and this will not be described here for brevity.

In some implementations of the present disclosure, the communication device 500 may be a network device in an implementation of the present disclosure, and the communication device 500 may implement corresponding processes implemented by the network device in various methods in the implementations of the present disclosure. That is to say, the communication device 500 in an implementation of the present disclosure may correspond to the network device 400 in an implementation of the present disclosure, and may correspond to a corresponding subject performing the method 200 in an implementation of the present disclosure, and this will not be described here for brevity.

It should be understood that the various components in the device 500 are connected through a bus system. In addition to a data bus, the bus system further includes a power bus, a control bus, a status signal bus, etc.

In addition, an implementation of the present disclosure also provides a chip, which may be an integrated circuit chip with signal processing capability, and may implement or execute various methods, acts and logic block diagrams disclosed in the implementations of the present disclosure.

Optionally, the chip may be applied to various communication devices, so that the communication devices installed with the chip may execute disclosed various methods, acts and logic block diagrams in the implementations of the present disclosure.

Figure 10:
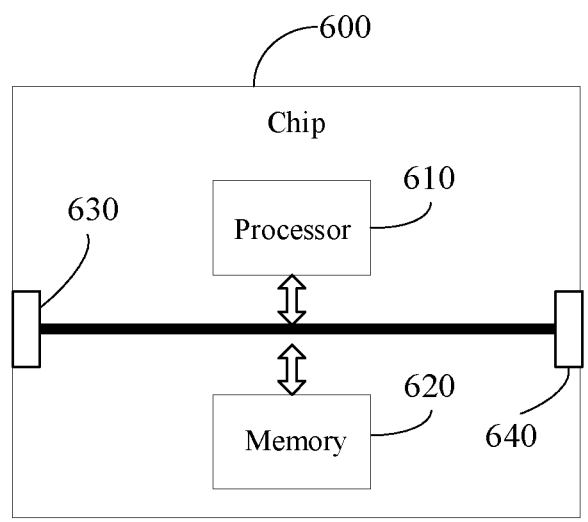
FIG. 10 is a schematic block diagram of a chip of an implementation of the present disclosure.

FIG. 10 is a schematic structural diagram of a chip according to an implementation of the present disclosure.

A shown in FIG. 10, the chip 600 may include a processor 610. The processor 610 may call and run a computer program from a memory to implement the method in an implementation of the present disclosure.

In some implementations of the present disclosure, the chip 600 may further include a memory 620. The processor 610 may call and run a computer program from the memory 620 to implement the method in an implementation of the present disclosure. The memory 620 may be configured to store indication information, or may be configured to store codes, instructions, etc., executed by the processor 610.

The memory 620 may be a separate device independent of the processor 610 or may be integrated in the processor 610.

In some implementations of the present disclosure, the chip 600 may further include an input interface 630. The processor 610 may control the input interface 630 to communicate with other devices or chips. Specifically, the processor 710 may acquire information or data sent by other devices or chips.

In some implementations of the present disclosure, the chip 600 may further include an output interface 640. The processor 610 may control the output interface 640 to communicate with other devices or chips. Specifically, the processor 710 may output information or data to other devices or chips.

In some implementations of the present disclosure, the chip may be applied in a network device of an implementation of the present disclosure, and the chip may implement the corresponding processes implemented by the network device in various methods of the implementations of the present disclosure, and this will not be repeated here for brevity.

In some implementations of the present disclosure, the chip may be applied in a terminal device of an implementation of the present disclosure, and the chip may implement the corresponding processes implemented by the terminal device in various methods of the implementations of the present disclosure, and this will not be repeated here for brevity.

It should be understood that the chip mentioned in an implementation of the present disclosure may be referred to as a system-level chip, a system chip, a chip system or a system-on-chip, etc. It also should be understood that the various components in the device 600 are connected through a bus system. In addition to a data bus, the bus system further includes a power bus, a control bus, a status signal bus, etc.

The processor may include, but is not limited to: a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component, etc.

The processor may implement or perform various methods, acts and logical block diagrams disclosed in an implementation of the present disclosure. The acts of the method disclosed with reference to implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an erasable programmable memory, or a register. The storage medium is located in the memory, and the processor reads the information in the memory and completes the acts of the above method in combination with its hardware.

The memory includes but is not limited to: volatile memory and/or nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Though an illustrative but not limiting description, many forms of RAMs are available, such as a static random access memory (SRAM), a dynamic RAM (DRAM), a synchronous DRAM (SDRAM), a double data rate SDRAM (DDR SDRAM), an enhanced SDRAM (ESDRAM), a Synch link DRAM (SLDRAM), and a Direct Rambus RAM (DR RAM).

It should be noted that the memory described herein includes any of these and other suitable types of memory.

An implementation of the present disclosure further provides a computer readable storage medium configured to store a computer program. The computer readable storage medium stores one or more programs including instructions that, when executed by a portable electronic device including multiple application programs, enable the portable electronic device to perform the method of an implementation shown in the method 200.

Optionally, the computer readable storage medium may be applied in a network device of an implementation of the present disclosure, and the computer program enables the computer to perform the corresponding processes implemented by the network device in various methods of the implementations of the present disclosure, and this will not be repeated here for brevity.

Optionally, the computer readable storage medium may be applied in a mobile terminal/terminal device of an implementation of the present disclosure, and the computer program enables the computer to perform the corresponding processes implemented by the mobile terminal/terminal device in various methods of the implementations of the present disclosure, and this will not be repeated here for brevity.

An implementation of the present disclosure also provides a computer program product including a computer program.

Optionally, the computer program product may be applied in a network device of an implementation of the present disclosure, and the computer program enables the computer to perform the corresponding processes implemented by the network device in various methods of the implementations of the present disclosure, and this will not be repeated here for brevity.

Optionally, the computer program product may be applied in a mobile terminal/terminal device of an implementation of the present disclosure, and the computer program enables the computer to perform the corresponding processes implemented by the mobile terminal/terminal device in various methods according to the implementations of the present disclosure, and this will not be repeated here for brevity.

An implementation of the present disclosure also provides a computer program. When the computer program is executed by a computer, the computer is enabled to execute the method of an implementation shown in the method 200.

Optionally, the computer program may be applied in a network device of an implementation of the present disclosure. When the computer program is run on the computer, the computer is enabled to perform the corresponding processes implemented by the network device in various methods of the implementations of the present disclosure, and this will not be repeated here for brevity.

An implementation of the present disclosure also provides a communication system, which may include a terminal device 300 as shown in FIG. 7 and a network device 400 as shown in FIG. 8. Herein, the terminal device 300 may be configured to implement the corresponding functions implemented by the terminal device in the above-mentioned method 200, and the network device 400 may be configured to implement the corresponding functions implemented by the network device in the above-mentioned method 200, and this will not be repeated here for brevity.

It should be noted that the term "system", etc. in this article may also be called "network management architecture" or "network system".

It should be understood that the terms used in implementations of the present disclosure and the appended claims are for the purpose of describing specific implementations only but are not intended to limit implementations of the present disclosure.

For example, the singular forms "a", "said", "aforementioned", and "the" used in the implementations of the present disclosure and the appended claims are also intended to include the plural forms unless the context clearly indicates other meanings.

Those of ordinary skill in the art will recognize that the exemplary elements and algorithm acts described in combination with the implementations disclosed herein may be implemented in electronic hardware, or a combination of computer software and electronic hardware.

Whether these functions are implemented in hardware or software depends on the specific application and design constraints of the technical solution. Those skilled in the art may use different manners to realize the described functions for each particular application, but such realization should not be considered to be beyond the scope of implementations of the present disclosure.

The function units may be stored in a computer readable storage medium if realized in a form of software functional units and sold or used as a separate product. Based on this understanding, the technical solution of implementations of the present disclosure, in essence, or the part contributing to the existing art, or a part of the technical solution, may be embodied in the form of a software product stored in a storage medium, including several instructions for causing a computer device (which may be a personal computer, a server, or a network device, etc.) to perform all or part of the acts of the methods described in implementations of the present disclosure. The aforementioned storage medium includes a medium capable of storing program codes, such as, a U disk, a mobile hard disk, a read-only memory (ROM), a magnetic disk or an optical disk.

Those skilled in the art may clearly understand that for convenience and conciseness of description, the specific working processes of the systems, devices and units described above may refer to the corresponding processes in the method implementations and will not be described here.

In several implementations provided by the present disclosure, it should be understood that the disclosed systems, devices and methods may be implemented in other ways.

For example, the division of the units or modules or components in the device implementations described above is only a logical function division, and there may be other division manners in actual realization. For example, multiple units or modules or components may be combined or integrated into another system, or some units or modules or components may be ignored or not executed.

For another example, the units or modules or components described as a separate/displayed component may or may not be physically separated, that is, they may be located in one place or may be distributed over multiple network units. Some or all of the units/modules/components may be selected according to practical needs to achieve a purpose of the implementations of the present disclosure.

Finally, it needs to explain that the mutual coupling or direct coupling or communication connection shown or discussed may be indirect coupling or communication connection between devices or units through some interface, and may be in electrical, mechanical or other forms.

The foregoing is merely exemplary implementations of the present disclosure, but the protection scope of implementations of the present disclosure is not limited thereto. Any person skilled in the art may easily conceive variations or substitutions within the technical scope disclosed by implementations of the present disclosure, which should be included within the protection scope of implementations of the present disclosure. Therefore, the protection scope of the implementations of the present disclosure should be decided by the protection scope of the claims.

What we claim is:

1. A wireless communication method, comprising:
determining at least two uplink channels to be transmitted based on at least two types of uplink channels by obtaining respective multiplexing transmission channels of the at least two types of uplink channels, wherein the at least two uplink channels to be transmitted are respectively used for transmitting part or all of information carried by the at least two types of uplink channels, and wherein the at least two types of uplink channels are overlapped, and wherein a number of the at least two uplink channels to be transmitted is equal to a number of the at least two types of uplink channels, and wherein the at least two uplink channels to be transmitted correspond to the at least two types of uplink channels one by one, and wherein each type of uplink channels of the at least two types of uplink channels comprises a plurality of uplink channels;
determining a target uplink channel based on an overlapping situation of the at least two uplink channels to be transmitted, wherein determining the target uplink channel comprises:

determining whether a multiplexing timing relationship of the at least two uplink channels is satisfied based on timing information of the at least two uplink channels; and in response to a determination that the multiplexing timing relationship is satisfied, determining the target uplink channel; and transmitting the target uplink channel, wherein the target uplink channel is used for transmitting part of information carried by the at least two uplink channels to be transmitted.

2. The method of claim 1, wherein priorities of the at least two types of uplink channels are different.

3. The method of claim 1, wherein:

if the at least two uplink channels to be transmitted are overlapped, the target uplink channel only comprises one uplink channel; and determining the target uplink channel comprises determining a first uplink channel to be transmitted in the at least two uplink channels to be transmitted as the target uplink channel, wherein the first uplink channel to be transmitted is an uplink channel with a highest priority in the at least two uplink channels to be transmitted.

4. The method of claim 3, wherein determining the target uplink channel comprises:

determining the target uplink channel according to the information carried by the at least two uplink channels to be transmitted.

5. The method of claim 1, wherein information carried by the target uplink channel only comprises all of the information carried by a first uplink channel of the at least two uplink channels to be transmitted.

6. The method of claim 1, further comprising receiving indication information sent by a network device, wherein the indication information is used for indicating the at least two types of uplink channels, and wherein the indication information comprises information for indicating a channel priority corresponding to each uplink channel in the at least two types of uplink channels.

7. The method of claim 1, wherein:

the at least two uplink channels comprises a first uplink channel and a second uplink channel; and information carried by the target uplink channel comprises all of information carried by the first uplink channel and a first part of the information carried by the second uplink channel without carrying a second part of the information carried by the second uplink channel.

8. A terminal device, comprising: a processor and a transceiver, wherein the processor is configured to:

determine at least two uplink channels to be transmitted based on at least two types of uplink channels by obtaining respective multiplexing transmission channels of the at least two types of uplink channels, wherein the at least two uplink channels to be transmitted are respectively used for transmitting part or all of information carried by the at least two types of uplink channels, and wherein the at least two types of uplink channels are overlapped, and wherein a number of the at least two uplink channels to be transmitted is equal to a number of the at least two types of uplink channels, and wherein the at least two uplink channels to be transmitted correspond to the at least two types of uplink channels one by one, and wherein a number of the at least two uplink channels to be transmitted is equal to a number of the at least two types of uplink channels, and wherein the at least two uplink channels to be transmitted correspond to the at least two types of uplink channels one by one;

determine a target uplink channel based on an overlapping situation of the at least two uplink channels to be transmitted, wherein determining the target uplink channel comprises:

determining whether a multiplexing timing relationship of the at least two uplink channels is satisfied based on timing information of the at least two uplink channels; and in response to a determination that the multiplexing timing relationship is satisfied, determining the target uplink channel; and the transceiver is configured to transmit the target uplink channel, wherein the target uplink channel is used for transmitting part of information carried by the at least two uplink channels to be transmitted.

9. The terminal device of claim 8, wherein priorities of the at least two types of uplink channels are different.

10. The terminal device of claim 8, wherein:

if the at least two uplink channels to be transmitted are overlapped, the target uplink channel only comprises one uplink channel; and the processor is configured to determine a first uplink channel to be transmitted in the at least two uplink channels to be transmitted as the target uplink channel, wherein the first uplink channel to be transmitted is an uplink channel with a highest priority in the at least two uplink channels to be transmitted.

11. The terminal device of claim 10, wherein the processor is specifically configured to:

determine the target uplink channel according to the information carried by the at least two uplink channels to be transmitted.

12. The terminal device of claim 8, wherein the information carried by the target uplink channel only comprises all of the information carried by a first uplink channel to be transmitted.

13. The terminal device of claim 8, wherein the transceiver is further configured to receive indication information sent by a network device, wherein the indication information is used for indicating the at least two types of uplink channels, and wherein the indication information comprises information for indicating a channel priority corresponding to each uplink channel in the at least two types of uplink channels.

14. A network device, comprising: a processor and a memory, wherein the memory is configured to store a computer program that, when executed by the processor, processor is configured to perform operations comprising:

determining at least two uplink channels to be transmitted based on at least two types of uplink channels by obtaining respective multiplexing transmission channels of the at least two types of uplink channels, wherein the at least two uplink channels to be transmitted are respectively used for transmitting part or all of information carried by the at least two types of uplink channels, and wherein the at least two types of uplink channels are overlapped, and wherein a number of the at least two uplink channels to be transmitted is equal to a number of the at least two types of uplink channels, and wherein the at least two uplink channels to be transmitted correspond to the at least two types of uplink channels one by one, and wherein each type of uplink channels of the at least two types of uplink channels comprises a plurality of uplink channels;
determining a target uplink channel based on an overlapping situation of the at least two uplink channels to be transmitted, wherein determining the target uplink channel comprises:
determining whether a multiplexing timing relationship of the at least two uplink channels is satisfied based on timing information of the at least two uplink channels; and
in response to a determination that the multiplexing timing relationship is satisfied, determining the target uplink channel; and
receiving the target uplink channel, wherein the target uplink channel is used for transmitting part of information carried by the at least two uplink channels to be transmitted.

15. The network device of claim 14, wherein priorities of the at least two types of uplink channels are different.

16. The network device of claim 14, wherein:
if the at least two uplink channels to be transmitted are overlapped, the target uplink channel only comprises one uplink channel; and
the operations further comprise determining a first uplink channel to be transmitted in the at least two uplink channels to be transmitted as the target uplink channel, wherein the first uplink channel to be transmitted is an uplink channel with a highest priority in the at least two uplink channels to be transmitted.

17. The network device of claim 16, the operations further comprise determining the target uplink channel according to the information carried by the at least two uplink channels to be transmitted.

18. The network device of claim 14, wherein the information carried by the target uplink channel only comprises all of the information carried by a first uplink channel to be transmitted.

19. The network device of claim 14, the operations further comprising sending indication information, wherein the indication information is used for indicating the at least two types of uplink channels, and wherein the indication information comprises information for indicating a channel priority corresponding to each uplink channel in the at least two types of uplink channels.

* * * * *